US010331652B2

(12) United States Patent
Li et al.

(10) Patent No.: US 10,331,652 B2
(45) Date of Patent: Jun. 25, 2019

(54) METHOD AND APPARATUS FOR DETERMINING HOT PAGE IN DATABASE

(71) Applicant: Huawei Technologies Co., Ltd., Shenzhen (CN)

(72) Inventors: Haifeng Li, Beijing (CN); Yuanyuan Nie, Beijing (CN); Chunxin Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 267 days.

(21) Appl. No.: 15/344,181

(22) Filed: Nov. 4, 2016

(65) Prior Publication Data

US 2017/0132268 A1    May 11, 2017

(30) Foreign Application Priority Data

Nov. 5, 2015    (CN) .......................... 2015 1 0751156

(51) Int. Cl.
*G06F 3/06* (2006.01)
*G06F 16/23* (2019.01)
(Continued)

(52) U.S. Cl.
CPC ........ *G06F 16/2322* (2019.01); *G06F 16/217* (2019.01); *G06F 16/22* (2019.01);
(Continued)

(58) Field of Classification Search
None
See application file for complete search history.

(56) References Cited

U.S. PATENT DOCUMENTS 4,326,442 A * 4/1982 Suzuki ................... G10H 5/002
341/26
6,747,858 B1 * 6/2004 Sculley .............. H03H 17/0621
361/61
(Continued)

FOREIGN PATENT DOCUMENTS

CN    101196890 A    6/2008
CN    102156714 A    8/2011
(Continued)

OTHER PUBLICATIONS

Stackexchange.com, Web Application—Calculate Peak Concurrent Users on a Website, Softwqre Quality Assurance & Testing Stack Exchange, http://sqa.stackexchange.com/questions/1508/calculate-peak-concurrent-users-on-a-website, Jul. 28, 2011, 2 pages.

*Primary Examiner* — Jau Shya Meng
(74) *Attorney, Agent, or Firm* — Slater Matsil, LLP

(57) ABSTRACT

The present invention provides a method for determining a hot page in a database. The method includes: when the database is accessed, configuring a counter for each of N pages in the database, where each counter is used to count a quantity of times of concurrent access to a page corresponding to the counter, the concurrent access means that at least one read command or write command accessing the page needs to wait for accessing the page, the N pages are all pages in the database or N pages in the database, and N is a positive integer; and calculating, according to a quantity of times of concurrent access to the $K^{th}$ page and an access time parameter, whether frequency of concurrent access to the $K^{th}$ page exceeds a specific threshold, so as to determine that the $K^{th}$ page is a hot page.

20 Claims, 7 Drawing Sheets

(51) Int. Cl.
*G06F 16/22* (2019.01)
*G06F 16/21* (2019.01)

(52) U.S. Cl.
CPC .......... *G06F 16/2336* (2019.01); *G06F 3/061* (2013.01); *G06F 3/0653* (2013.01); *G06F 3/0656* (2013.01)

(56) References Cited

U.S. PATENT DOCUMENTS

| | | | |
|---|---|---|---|
| 7,921,085 B2 | 4/2011 | Guo et al. | |
| 8,250,111 B2 | 8/2012 | Huras et al. | |
| 9,544,798 B1* | 1/2017 | Ahmadzadeh | H04W 24/08 |
| 2006/0224594 A1 | 10/2006 | Goyal et al. | |
| 2008/0140627 A1 | 6/2008 | Bossman et al. | |
| 2010/0145996 A1* | 6/2010 | Ben-Itzhak | G06F 17/30551 |
| | | | 707/783 |
| 2010/0223243 A1 | 9/2010 | Huras et al. | |
| 2013/0091181 A1 | 4/2013 | Arenswald et al. | |
| 2015/0186051 A1* | 7/2015 | Gurajada | G06F 3/0611 |
| | | | 711/113 |
| 2016/0132540 A1* | 5/2016 | Balasa Ramnath | ........................ |
| | | | G06F 17/30336 |
| | | | 707/741 |
| 2016/0203180 A1 | 7/2016 | Hanai et al. | |

FOREIGN PATENT DOCUMENTS

| | | |
|---|---|---|
| CN | 102436478 A | 5/2012 |
| CN | 103885815 A | 6/2014 |
| CN | 104217004 A | 12/2014 |
| CN | 104598459 A | 5/2015 |
| CN | 104978335 A | 10/2015 |
| JP | H0310343 A | 1/1991 |
| JP | 2014182674 A | 9/2014 |
| JP | 2015170239 A | 9/2015 |
| RU | 2012145068 A | 4/2014 |

* cited by examiner

METHOD AND APPARATUS FOR DETERMINING HOT PAGE IN DATABASE

CROSS-REFERENCE TO RELATED APPLICATIONS

This application claims priority to Chinese Patent Application No. 201510751156.8, filed on Nov. 5, 2015, which is hereby incorporated by reference in its entirety.

TECHNICAL FIELD

The present invention relates to the field of electronic communications technologies, and in particular, to a method and an apparatus for determining a hot page in a database.

BACKGROUND

In a database system, data is stored in a form of page. When a page is concurrently accessed, a lock mechanism needs to be used to ensure consistency. A read lock blocks a write operation on the page. A write lock blocks read and write operations on the page. When blocking occurs, it is referred to as contention on the page. The contention on the page causes a data access latency, which is also referred to as a sleep state, and therefore, total performance of the database is severely affected. Key factors that cause contention on a page are: there is data of more than one line on a same page; a write operation is frequently performed on at least one line; read and write operations are frequently performed on at least another line.

Identifying a hot page and taking a corresponding measure, which is generally to split content on the hot page into a plurality of pages, can reduce contention on the page, and improve the total performance of the database system.

Currently, only contention on a page, that is, an absolute value of a quantity of times of access to the page, is considered in the prior art, a real hot page cannot be identified, and only a page with a largest quantity of times of access can be identified.

SUMMARY

The present disclosure provides a method and an apparatus for determining a hot page in a database. Frequency of access to a page in contention in the database is calculated, not only an absolute value of a quantity of times of access to the page in contention is considered, but also a page with a small absolute value of a quantity of times of access but with very high contention access frequency can be identified, so that a hot page in the database can be determined more accurately.

According to a first aspect, a method for determining a hot page in a database is provided. The method includes configuring a counter for each of N pages in the database when the database is accessed. Each counter is used to count a number of times of concurrent access to a page corresponding to the counter, where the initial values of the counters are equal. At least one read command or write command accessing the page waits for accessing the page, where the N pages are all pages in the database or N pages in the database, and N is a positive integer. The method further includes calculating, according to a quantity of times of concurrent access to the $K^{th}$ page and an access time parameter, frequency of concurrent access to the $K^{th}$ page, where K is a positive integer that is less than or equal to N. The method further includes determining that the $K^{th}$ page is a hot page when the frequency of concurrent access to the $K^{th}$ page is greater than or equal to a preset first threshold.

In a first possible implementation manner of the first aspect, the calculating includes: when the $K^{th}$ page is concurrently accessed, adding 1 to the $K^{th}$ counter corresponding to the $K^{th}$ page, and using a time point at which the $K^{th}$ page is concurrently accessed for the first time as a start counting time point, where K is a positive integer that is greater than or equal to 1 but less than or equal to N. When the $K^{th}$ page is concurrently accessed for the $M^{th}$ time, using a time point at which the $K^{th}$ page is concurrently accessed for the $M^{th}$ time as an end counting time point, where M is a positive integer. The method further includes calculating, according to the start counting time point and end counting time point of the $K^{th}$ page and M, the frequency of concurrent access to the $K^{th}$ page.

In a second possible implementation manner of the first aspect, the calculating, according to a quantity of times of concurrent access to the $K^{th}$ page and an access time parameter, frequency of concurrent access to the $K^{th}$ page, specifically includes periodically counting, according to a preset counting period T0, a value increment of a counter corresponding to the $K^{th}$ page; and calculating, according to the T0 and the value increment of the counter corresponding to the $K^{th}$ page, the frequency of concurrent access to the $K^{th}$ page.

In a third possible implementation manner of the first aspect, the calculating, according to a quantity of times of concurrent access to the $K^{th}$ page and an access time parameter, frequency of concurrent access to the $K^{th}$ page, specifically includes: periodically subtracting, according to a preset counting period T0, J from a counter corresponding to the $K^{th}$ page, where J is a positive integer; periodically counting, according to the period T0, a value obtained after J is subtracted from the counter corresponding to the $K^{th}$ page; and using the value obtained after J is subtracted from the counter corresponding to the $K^{th}$ page, as the frequency of concurrent access to the $K^{th}$ page.

According to a second aspect, an apparatus for determining a hot page in a database is provided and includes a processing module, configured to configure a counter for each of N pages in the database in a case in which the database is accessed, where each counter is used to count a quantity of times of concurrent access to a page corresponding to the counter, initial values of the counters are equal, the concurrent access means that at least one read command or write command accessing the page needs to wait for accessing the page, the N pages are all pages in the database or N pages in the database, and N is a positive integer. The processing module is further configured to calculate, according to a quantity of times of concurrent access to the $K^{th}$ page and an access time parameter, frequency of concurrent access to the $K^{th}$ page, where K is a positive integer that is less than or equal to N. The processing module is further configured to determine, in a case in which the frequency of concurrent access to the $K^{th}$ page is greater than or equal to a preset first threshold, that the $K^{th}$ page is a hot page. A storage module is configured to store the database.

In a first possible implementation manner of the second aspect, in an aspect of being further configured to calculate, according to a quantity of times of concurrent access to the $K^{th}$ page and an access time parameter, frequency of concurrent access to the $K^{th}$ page, the processing module is specifically configured to add 1 to the $K^{th}$ counter corresponding to the $K^{th}$ page, and use a time point at which the $K^{th}$ page is concurrently accessed for the first time as a start counting time point when the $K^{th}$ page is concurrently accessed, where K is a positive integer that is greater than or equal to 1 but less than or equal to N. When the $K^{th}$ page is concurrently accessed for the $M^{th}$ time, use a time point at which the $K^{th}$ page is concurrently accessed for the $M^{th}$ time as an end counting time point, where M is a positive integer. The processing module is further configured to calculate, according to the start counting time point and end counting time point of the $K^{th}$ page and M, the frequency of concurrent access to the $K^{th}$ page.

In a second possible implementation manner of the second aspect, in an aspect of being further configured to calculate, according to a quantity of times of concurrent access to the $K^{th}$ page and an access time parameter, frequency of concurrent access to the $K^{th}$ page, the processing module is specifically configured to: periodically count, according to a preset counting period T0, a value increment of a counter corresponding to the $K^{th}$ page; and calculate, according to the T0 and the value increment of the counter corresponding to the $K^{th}$ page, the frequency of concurrent access to the $K^{th}$ page.

In a third possible implementation manner of the second aspect, in an aspect of being further configured to calculate, according to a quantity of times of concurrent access to the $K^{th}$ page and an access time parameter, frequency of concurrent access to the $K^{th}$ page, the processing module is specifically configured to: periodically subtract, according to a preset counting period T0, J from a counter corresponding to the $K^{th}$ page, where J is a positive integer; periodically count, according to the period T0, a value obtained after J is subtracted from the counter corresponding to the $K^{th}$ page; and use the value obtained after J is subtracted from the counter corresponding to the $K^{th}$ page, as the frequency of concurrent access to the $K^{th}$ page.

According to a third aspect, an apparatus for determining a hot page in a database is provided and includes a processor, configured to configure a counter for each of N pages in the database in a case in which the database is accessed, where each counter is used to count a quantity of times of concurrent access to a page corresponding to the counter, initial values of the counters are equal, the concurrent access means that at least one read command or write command accessing the page needs to wait for accessing the page, the N pages are all pages in the database or N pages in the database, and N is a positive integer. The processor is further configured to calculate, according to a quantity of times of concurrent access to the $K^{th}$ page and an access time parameter, frequency of concurrent access to the $K^{th}$ page, where K is a positive integer that is less than or equal to N. The processor is further configured to determine, in a case in which the frequency of concurrent access to the $K^{th}$ page is greater than or equal to a preset first threshold, that the $K^{th}$ page is a hot page. A memory is configured to store the database.

In a first possible implementation manner of the third aspect, in an aspect of being further configured to calculate, according to a quantity of times of concurrent access to the $K^{th}$ page and an access time parameter, frequency of concurrent access to the $K^{th}$ page, the processor is configured to add 1 to the $K^{th}$ counter corresponding to the $K^{th}$ page, and use a time point at which the $K^{th}$ page is concurrently accessed for the first time as a start counting time point when the $K^{th}$ page is concurrently accessed, where K is a positive integer that is greater than or equal to 1 but less than or equal to N. When the $K^{th}$ page is concurrently accessed for the $M^{th}$ time, use a time point at which the $K^{th}$ page is concurrently accessed for the $M^{th}$ time as an end counting time point, where M is a positive integer. The processor further is configured to calculate, according to the start counting time point and end counting time point of the $K^{th}$ page and M, the frequency of concurrent access to the $K^{th}$ page.

In a second possible implementation manner of the third aspect, in an aspect of being further configured to calculate, according to a quantity of times of concurrent access to the $K^{th}$ page and an access time parameter, frequency of concurrent access to the $K^{th}$ page, the processor is specifically configured to: periodically count, according to a preset counting period T0, a value increment of a counter corresponding to the $K^{th}$ page; and calculate, according to the T0 and the value increment of the counter corresponding to the $K^{th}$ page, the frequency of concurrent access to the $K^{th}$ page.

In a third possible implementation manner of the third aspect, in an aspect of being further configured to calculate, according to a quantity of times of concurrent access to the $K^{th}$ page and an access time parameter, frequency of concurrent access to the $K^{th}$ page, the processor is specifically configured to: periodically subtract, according to a preset counting period T0, J from a counter corresponding to the $K^{th}$ page, where J is a positive integer; periodically count, according to the period T0, a value obtained after J is subtracted from the counter corresponding to the $K^{th}$ page; and use the value obtained after J is subtracted from the counter corresponding to the $K^{th}$ page, as the frequency of concurrent access to the $K^{th}$ page.

A counter is configured for each of N pages in a database, and is used to count a quantity of times of concurrent access to a page corresponding to the counter. According to a quantity of times of concurrent access to the $K^{th}$ page and an access time parameter, frequency of concurrent access to the $K^{th}$ page is calculated, so that a hot page in the database is determined. Therefore, a hot page is determined not merely according to a quantity of times of concurrent access, and a real hot page in the database is determined.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention.

Figure 1:
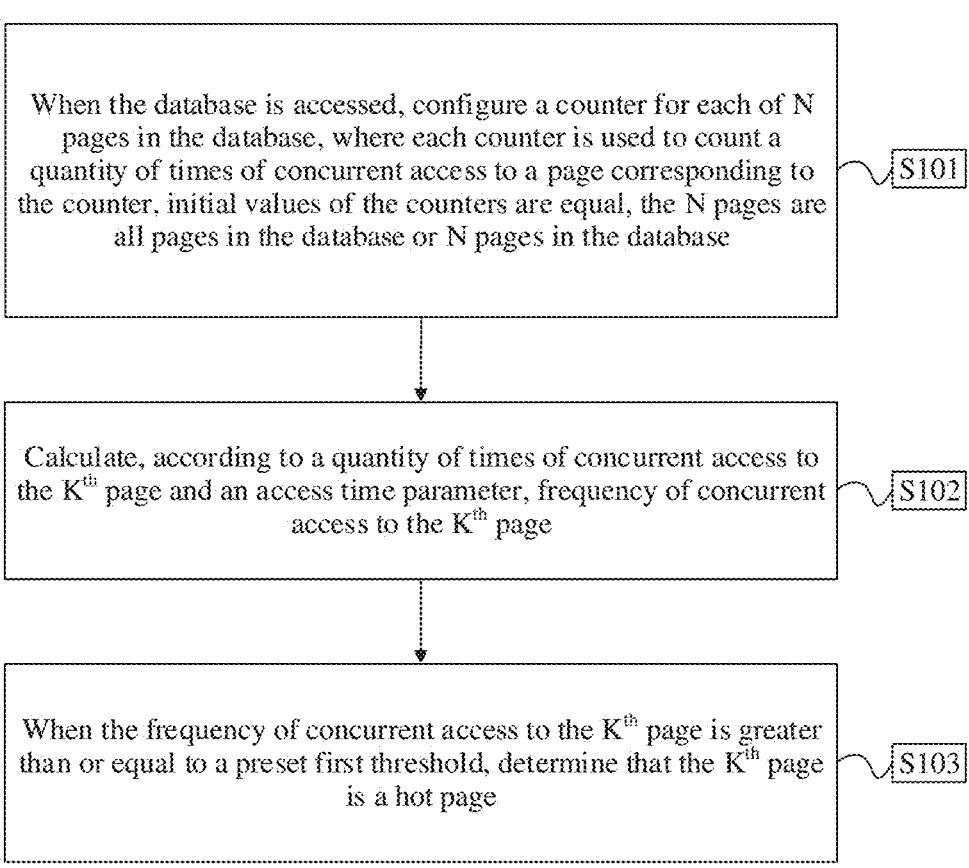
FIG. 1 is a flowchart of a method for determining a hot page in a database according to an embodiment of the present invention.

As shown in FIG. 1, a method for determining a hot page in a database according to an embodiment of the present invention includes configuring a counter for each of N pages in the database when the database is accessed, where each counter is used to count a quantity of times of concurrent access to a page corresponding to the counter, initial values of the counters are equal. The concurrent access means that at least one read command or write command accessing the page needs to wait for accessing the page, the N pages are all pages in the database or N pages in the database, and N is a positive integer. The method further includes calculating, according to a quantity of times of concurrent access to the $K^{th}$ page and an access time parameter, frequency of concurrent access to the $K^{th}$ page, where K is a positive integer that is less than or equal to N. When the frequency of concurrent access to the $K^{th}$ page is greater than or equal to a preset first threshold, determining that the $K^{th}$ page is a hot page, where specifically, the preset first threshold may be an absolute value that is preset according to an actual requirement, or may be a preset relative value that is expressed in a form of a percentage.

A counter is configured for each of N pages in a database, and is used to count a quantity of times of concurrent access to a page corresponding to the counter. According to a quantity of times of concurrent access to the $K^{th}$ page and an access time parameter, frequency of concurrent access to the $K^{th}$ page is calculated, so that a hot page in the database is determined. Therefore, a hot page is determined not merely according to a quantity of times of concurrent access, and a real hot page in the database is determined.

Figure 2:
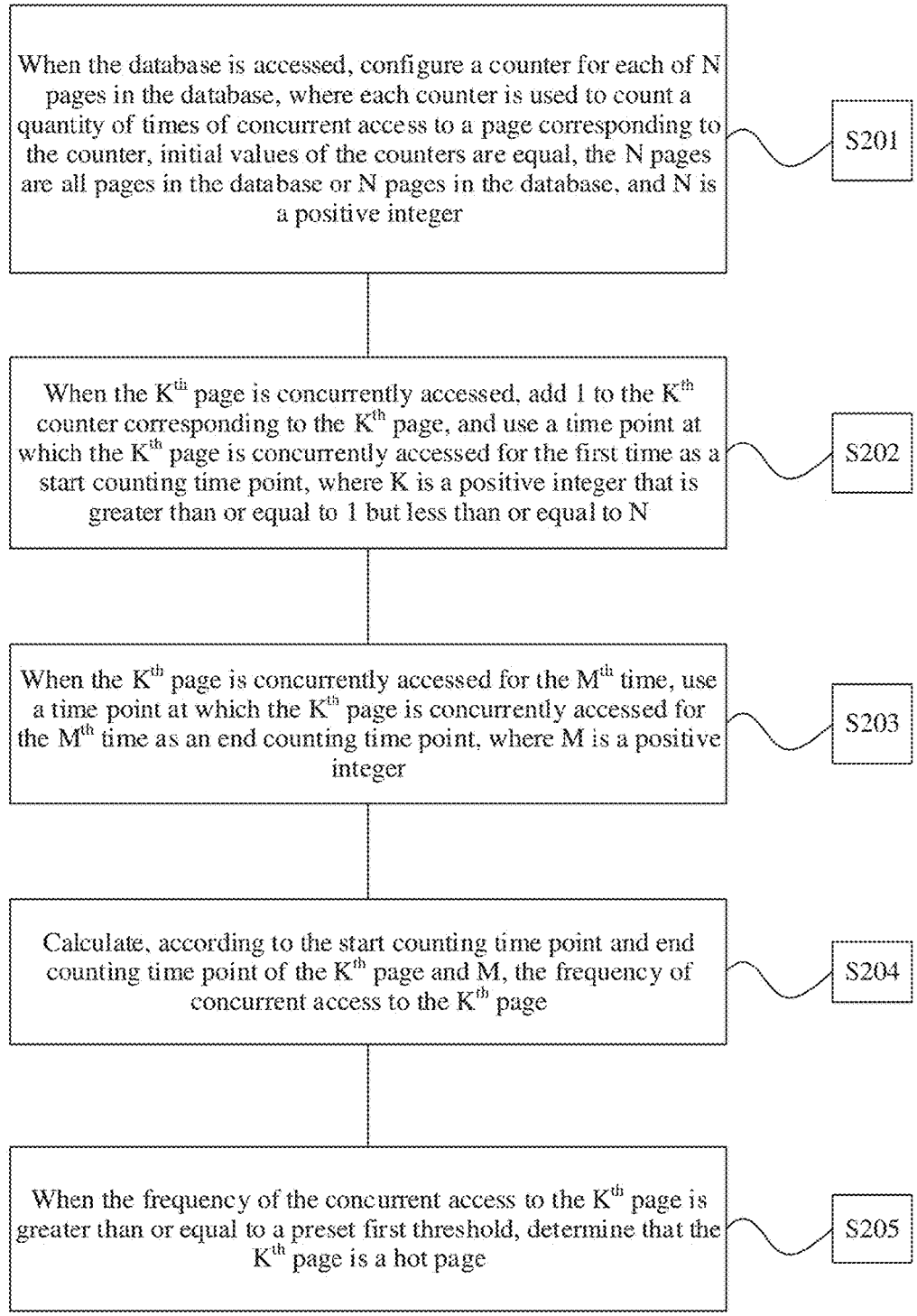
FIG. 2 is a flowchart of another method for determining a hot page in a database according to an embodiment of the present invention.

As shown in FIG. 2, another method for determining a hot page in a database according to an embodiment of the present invention includes the following. In a case in which the database is accessed, configuring a counter for each of N pages in the database, where each counter is used to count a quantity of times of concurrent access to a page corresponding to the counter, initial values of the counters are equal, the concurrent access means that at least one read command or write command accessing the page needs to wait for accessing the page, the N pages are all pages in the database or N pages in the database, and N is a positive integer. The method further includes calculating, according to a quantity of times of concurrent access to the $K^{th}$ page and an access time parameter, frequency of concurrent access to the $K^{th}$ page, where K is a positive integer that is less than or equal to N. In a case in which the frequency of concurrent access to the $K^{th}$ page is greater than or equal to a preset first threshold, determining that the $K^{th}$ page is a hot page, where specifically, the preset first threshold may be an absolute value that is preset according to an actual requirement, or may be a preset relative value that is expressed in a form of a percentage.

Optionally, the calculating, according to a quantity of times of concurrent access to the $K^{th}$ page and an access time parameter, frequency of concurrent access to the $K^{th}$ page, specifically includes: in a case in which the $K^{th}$ page is concurrently accessed, adding 1 to the $K^{th}$ counter corresponding to the $K^{th}$ page, and using a time point at which the $K^{th}$ page is concurrently accessed for the first time as a start counting time point, where K is a positive integer that is greater than or equal to 1 but less than or equal to N. In a case in which the $K^{th}$ page is concurrently accessed for the $M^{th}$ time, using a time point at which the $K^{th}$ page is concurrently accessed for the $M^{th}$ time as an end counting time point, where M is a positive integer. The method further includes calculating, according to the start counting time point and end counting time point of the $K^{th}$ page and M, the frequency of concurrent access to the $K^{th}$ page, by using the following formula: frequency=(End counting time point−Start counting time point)/M.

Further, that the concurrent access means that at least one read command or write command accessing the page needs to wait for accessing the page, specifically includes: the concurrent access means that the at least one read command or write command accessing the page needs to wait for accessing data of the $N^{th}$ line on the page, where N is a positive integer. Alternatively, the concurrent access means that the at least one read command or write command accessing the page needs to wait for accessing data on the page.

A counter is configured for each of N pages in a database, and is used to count a quantity of times of concurrent access to a page corresponding to the counter. According to a start counting time point and an end counting time point of the $K^{th}$ page and M, frequency of concurrent access to the $K^{th}$ page is calculated, so that a hot page in the database is determined. Therefore, a hot page is determined not merely according to a quantity of times of concurrent access, and a real hot page in the database is determined.

Figure 3:
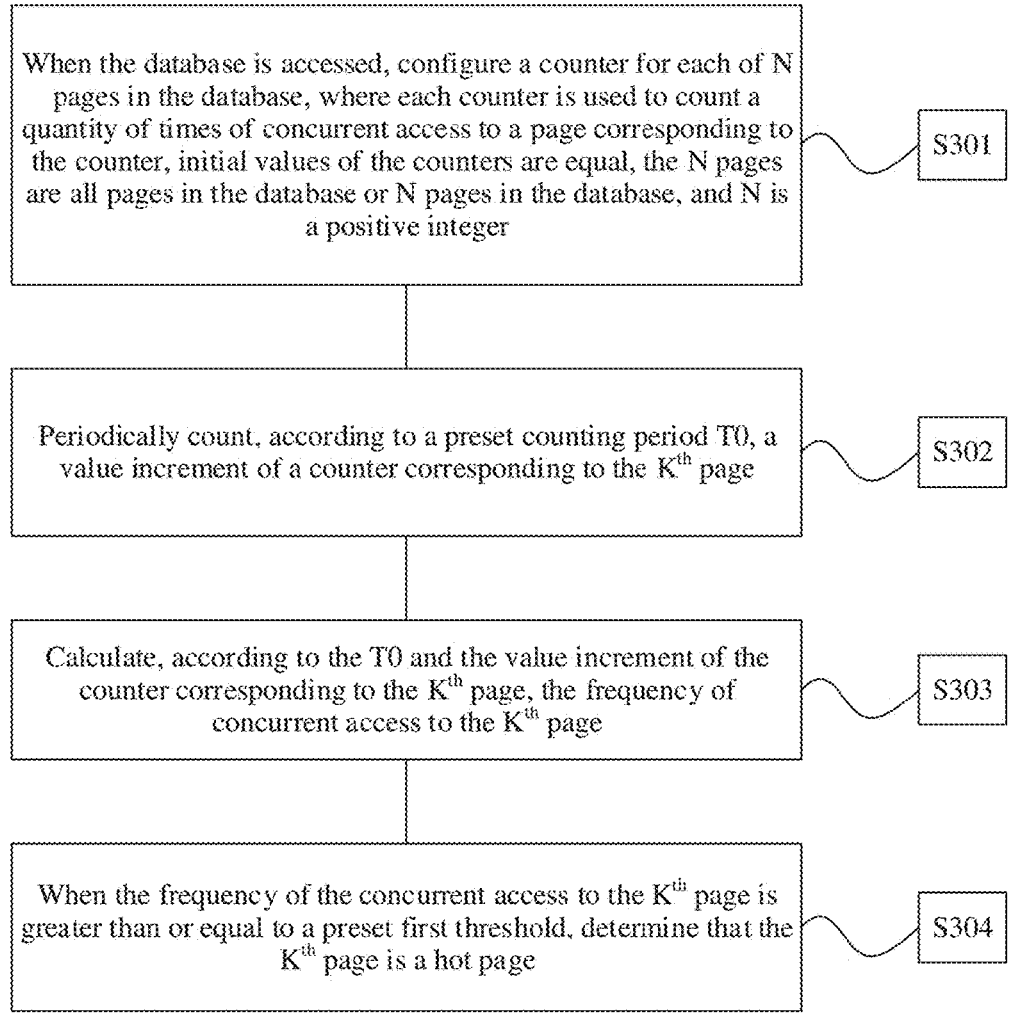
FIG. 3 is a flowchart of another method for determining a hot page in a database according to an embodiment of the present invention.

As shown in FIG. 3, another method for determining a hot page in a database according to an embodiment of the present invention includes in a case in which the database is accessed, configuring a counter for each of N pages in the database, where each counter is used to count a quantity of times of concurrent access to a page corresponding to the counter, initial values of the counters are equal, the concurrent access means that at least one read command or write command accessing the page needs to wait for accessing the page, the N pages are all pages in the database or N pages in the database, and N is a positive integer. The method further includes calculating, according to a quantity of times of concurrent access to the $K^{th}$ page and an access time parameter, frequency of concurrent access to the $K^{th}$ page, where K is a positive integer that is less than or equal to N. The method further includes determining that the $K^{th}$ page is a hot page in a case in which the frequency of concurrent access to the $K^{th}$ page is greater than or equal to a preset first threshold. The preset first threshold may be an absolute value that is preset according to an actual requirement, or may be a preset relative value that is expressed in a form of a percentage.

Optionally, the calculating, according to a quantity of times of concurrent access to the $K^{th}$ page and an access time parameter, frequency of concurrent access to the $K^{th}$ page, specifically includes: periodically counting, according to a preset counting period T0, a value increment of a counter corresponding to the $K^{th}$ page, where the T0 may be specifically set according to an actual scenario, or a historical record, or a current requirement; and calculating, according to the T0 and the value increment of the counter corresponding to the $K^{th}$ page, the frequency of concurrent access to the $K^{th}$ page.

According to a preset counting period T0, a value increment of a counter corresponding to the $K^{th}$ page is periodically counted; and frequency of concurrent access to the $K^{th}$ page is obtained, so that a hot page in the database is determined. Therefore, a hot page is determined not merely according to a quantity of times of concurrent access, and a real hot page in the database is determined.

Further, that the concurrent access means that at least one read command or write command accessing the page needs to wait for accessing the page, specifically includes: the concurrent access means that the at least one read command or write command accessing the page needs to wait for accessing data of the $N^{th}$ line on the page, where N is a positive integer; or the concurrent access means that the at least one read command or write command accessing the page needs to wait for accessing data on the page.

Figure 4:
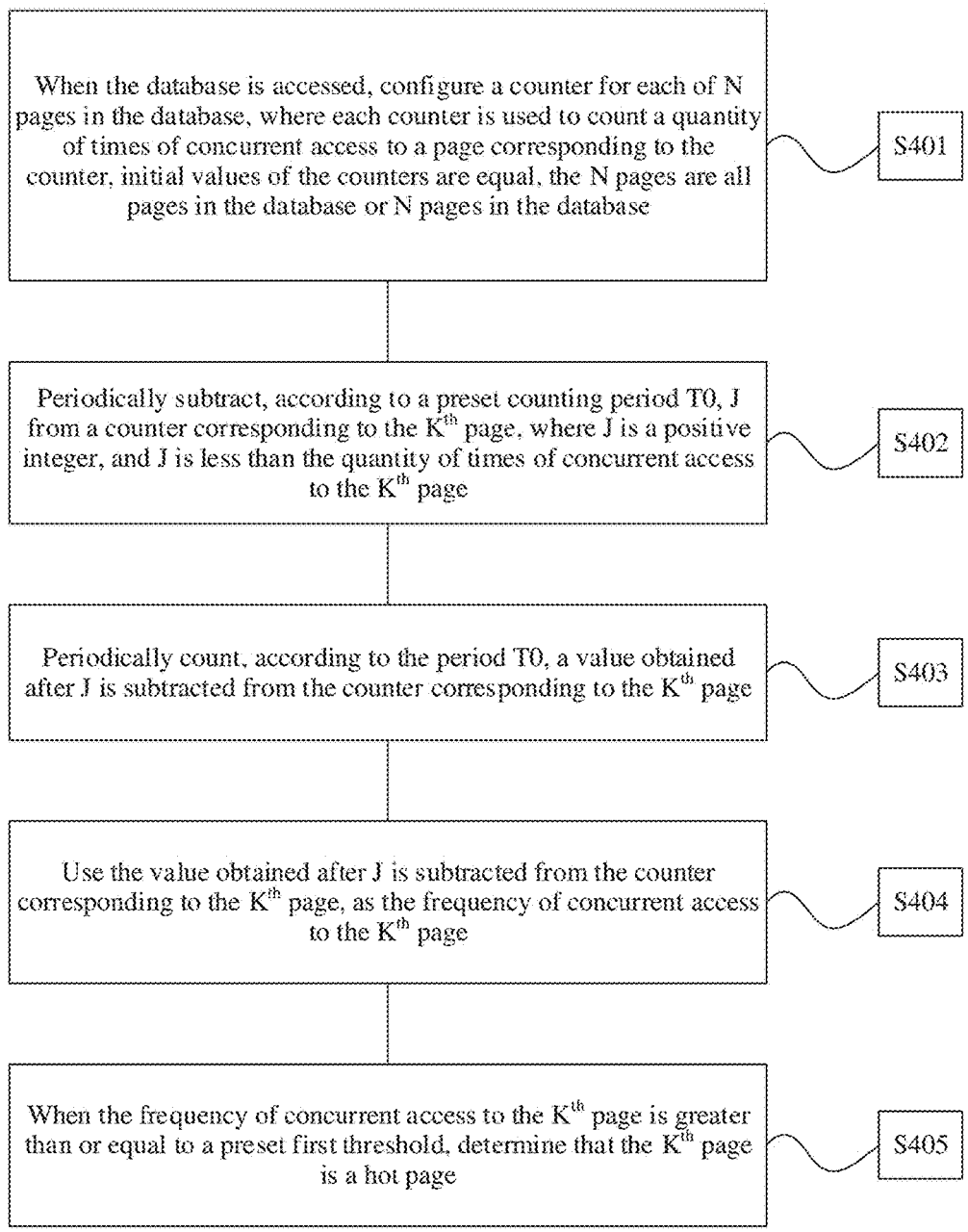
FIG. 4 is a flowchart of another method for determining a hot page in a database according to an embodiment of the present invention.

As shown in FIG. 4, another method for determining a hot page in a database according to an embodiment of the present invention includes: in a case in which the database is accessed, configuring a counter for each of N pages in the database, where each counter is used to count a quantity of times of concurrent access to a page corresponding to the counter, initial values of the counters are equal, the concurrent access means that at least one read command or write command accessing the page needs to wait for accessing the page, the N pages are all pages in the database or N pages in the database, and N is a positive integer; calculating, according to a quantity of times of concurrent access to the $K^{th}$ page and an access time parameter, frequency of concurrent access to the $K^{th}$ page, where K is a positive integer that is less than or equal to N; and in a case in which the frequency of concurrent access to the $K^{th}$ page is greater than or equal to a preset first threshold, determining that the $K^{th}$ page is a hot page, where specifically, the preset first threshold may be an absolute value that is preset according to an actual requirement, or may be a preset relative value that is expressed in a form of a percentage.

Optionally, the calculating, according to a quantity of times of concurrent access to the $K^{th}$ page and an access time parameter, frequency of concurrent access to the $K^{th}$ page, specifically includes: periodically subtracting, according to a preset counting period T0, J from a counter corresponding to the $K^{th}$ page, where the T0 may be specifically set according to an actual scenario, or a historical record, or a current requirement; periodically counting, according to the period T0, a value obtained after J is subtracted from the counter corresponding to the $K^{th}$ page, where J is a positive integer, and J is less than the quantity of times of concurrent access to the $K^{th}$ page; and using the value obtained after J is subtracted from the counter corresponding to the $K^{th}$ page, as the frequency of concurrent access to the $K^{th}$ page.

According to the period T0, a value obtained after J is subtracted from a counter corresponding to the $K^{th}$ page is periodically counted; and the value obtained after J is subtracted from the counter corresponding to the $K^{th}$ page is used as frequency of concurrent access to the $K^{th}$ page, so that a hot page in a database is determined. Therefore, a hot page is determined not merely according to a quantity of times of concurrent access, and a real hot page in the database is determined.

Further, that the concurrent access means that at least one read command or write command accessing the page needs to wait for accessing the page, specifically includes: the concurrent access means that the at least one read command or write command accessing the page needs to wait for accessing data of the $N^{th}$ line on the page, where N is a positive integer; or the concurrent access means that the at least one read command or write command accessing the page needs to wait for accessing data on the page.

Figure 5:
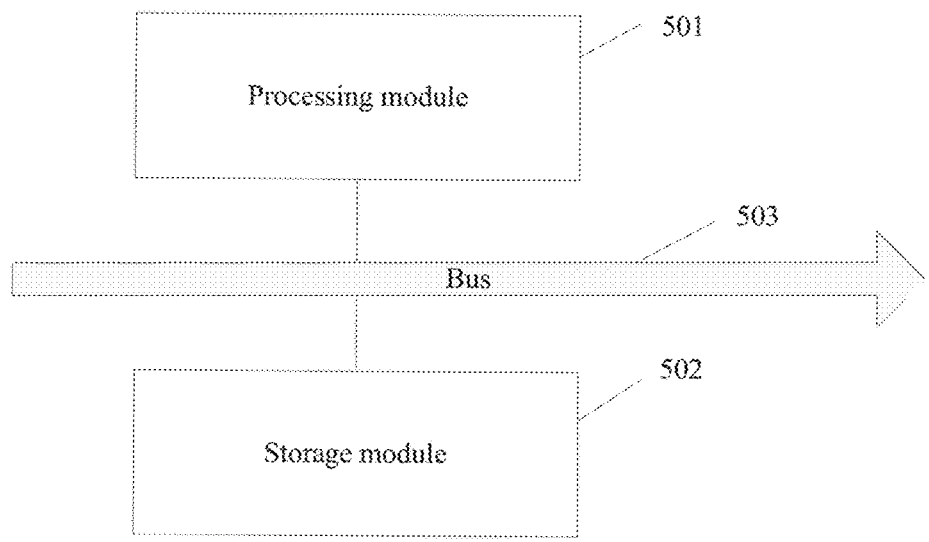
FIG. 5 is a structural diagram of an apparatus for determining a hot page in a database according to an embodiment of the present invention.

FIG. 5 is a structural diagram of an apparatus for determining a hot page in a database according to an embodiment of the present invention. The apparatus specifically includes a processing module 501, configured to configure a counter for each of N pages in the database in a case in which the database is accessed, where each counter is used to count a quantity of times of concurrent access to a page corresponding to the counter, initial values of the counters are equal, the concurrent access means that at least one read command or write command accessing the page needs to wait for accessing the page, the N pages are all pages in the database or N pages in the database, and N is a positive integer. The processing module 501 is further configured to calculate, according to a quantity of times of concurrent access to the $K^{th}$ page and an access time parameter, frequency of concurrent access to the $K^{th}$ page, where K is a positive integer that is less than or equal to N. The processing module 501 is further configured to determine, in a case in which the frequency of concurrent access to the $K^{th}$ page is greater than or equal to a preset first threshold, that the $K^{th}$ page is a hot page. A storage module 502 is configured to store the database.

The processing module 501 communicates with the storage module 502 by using a bus 503.

Optionally, in an aspect of being further configured to calculate, according to a quantity of times of concurrent access to the $K^{th}$ page and an access time parameter, frequency of concurrent access to the $K^{th}$ page, the processing module 501 is specifically configured to add 1 to the $K^{th}$ counter corresponding to the $K^{th}$ page, and use a time point at which the $K^{th}$ page is concurrently accessed for the first time as a start counting time point in a case in which the $K^{th}$ page is concurrently accessed. K is a positive integer that is greater than or equal to 1 but less than or equal to N. In a case in which the $K^{th}$ page is concurrently accessed for the $M^{th}$ time, use a time point at which the $K^{th}$ page is concurrently accessed for the $M^{th}$ time as an end counting time point, where M is a positive integer. The processing module 501 is further configured to calculate, according to the start counting time point and end counting time point of the $K^{th}$ page and M, the frequency of concurrent access to the $K^{th}$ page.

Optionally, in an aspect of being further configured to calculate, according to a quantity of times of concurrent access to the $K^{th}$ page and an access time parameter, frequency of concurrent access to the $K^{th}$ page, the processing module 501 is specifically configured to: periodically count, according to a preset counting period T0, a value increment of a counter corresponding to the $K^{th}$ page, where the T0 may be specifically set according to an actual scenario, or a historical record, or a current requirement; and calculate, according to the T0 and the value increment of the counter corresponding to the $K^{th}$ page, the frequency of concurrent access to the $K^{th}$ page.

Optionally, in an aspect of being further configured to calculate, according to a quantity of times of concurrent access to the $K^{th}$ page and an access time parameter, frequency of concurrent access to the $K^{th}$ page, the processing module 501 is specifically configured to: periodically subtract, according to a preset counting period T0, J from a counter corresponding to the $K^{th}$ page, where J is a positive integer, and J is less than the quantity of times of concurrent access to the $K^{th}$ page; periodically count, according to the period T0, a value obtained after J is subtracted from the counter corresponding to the $K^{th}$ page; and use the value obtained after J is subtracted from the counter corresponding to the $K^{th}$ page, as the frequency of concurrent access to the $K^{th}$ page.

Figure 6:
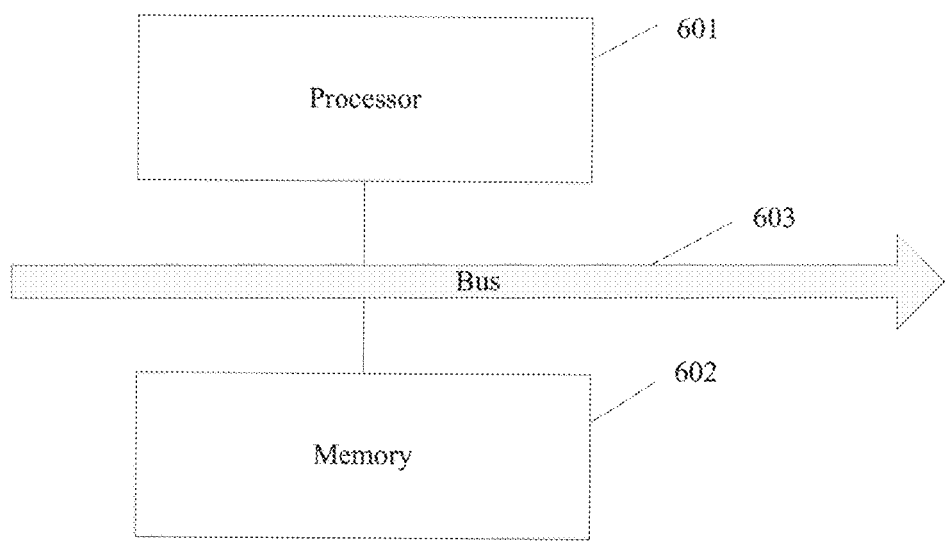
FIG. 6 is a structural diagram of another apparatus for determining a hot page in a database according to an embodiment of the present invention.

FIG. 6 is a structural diagram of another apparatus for determining a hot page in a database according to an embodiment of the present invention. The apparatus includes a processor 601 configured to configure a counter for each of N pages in the database in a case in which the database is accessed, where each counter is used to count a quantity of times of concurrent access to a page corresponding to the counter, initial values of the counters are equal, the concurrent access means that at least one read command or write command accessing the page needs to wait for accessing the page, the N pages are all pages in the database or N pages in the database, and N is a positive integer. The processor 601 is further configured to calculate, according to a quantity of times of concurrent access to the $K^{th}$ page and an access time parameter, frequency of concurrent access to the $K^{th}$ page, where K is a positive integer that is less than or equal to N. The processor 601 is further configured to determine, in a case in which the frequency of concurrent access to the $K^{th}$ page is greater than or equal to a preset first threshold, that the $K^{th}$ page is a hot page. A memory 602 is configured to store the database. The processor 601 communicates with the memory 602 by using a bus 603.

Optionally, in an aspect of being further configured to calculate, according to a quantity of times of concurrent access to the $K^{th}$ page and an access time parameter, frequency of concurrent access to the $K^{th}$ page, the processor 601 is specifically configured to: in a case in which the $K^{th}$ page is concurrently accessed, add 1 to the $K^{th}$ counter corresponding to the $K^{th}$ page, and use a time point at which the $K^{th}$ page is concurrently accessed for the first time as a start counting time point, where K is a positive integer that is greater than or equal to 1 but less than or equal to N. In a case in which the $K^{th}$ page is concurrently accessed for the $M^{th}$ time, use a time point at which the $K^{th}$ page is concurrently accessed for the $M^{th}$ time as an end counting time point, where M is a positive integer. The processor 601 is further configured to calculate, according to the start counting time point and end counting time point of the $K^{th}$ page and M, the frequency of concurrent access to the $K^{th}$ page.

Optionally, in an aspect of being further configured to calculate, according to a quantity of times of concurrent access to the $K^{th}$ page and an access time parameter, frequency of concurrent access to the $K^{th}$ page, the processor 601 is specifically configured to: periodically count, according to a preset counting period T0, a value increment of a counter corresponding to the $K^{th}$ page, where the T0 may be specifically set according to an actual scenario, or a historical record, or a current requirement; and calculate, according to the T0 and the value increment of the counter corresponding to the $K^{th}$ page, the frequency of concurrent access to the $K^{th}$ page.

Optionally, in an aspect of being further configured to calculate, according to a quantity of times of concurrent access to the $K^{th}$ page and an access time parameter, frequency of concurrent access to the $K^{th}$ page, the processor 601 is specifically configured to: periodically subtract, according to a preset counting period T0, J from a counter corresponding to the $K^{th}$ page, where J is a positive integer, and J is less than the quantity of times of concurrent access to the $K^{th}$ page; periodically count, according to the period T0, a value obtained after J is subtracted from the counter corresponding to the $K^{th}$ page; and use the value obtained after J is subtracted from the counter corresponding to the $K^{th}$ page, as the frequency of concurrent access to the $K^{th}$ page.

Figure 7:
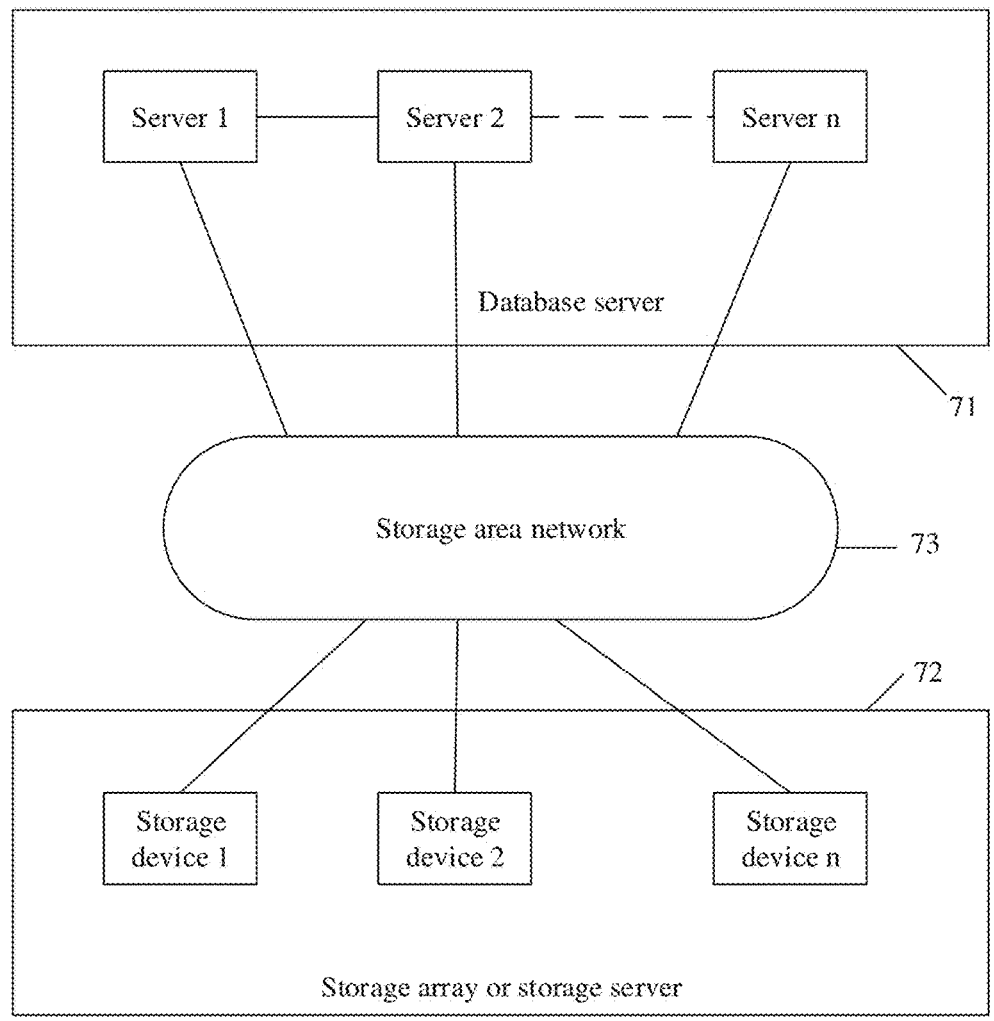
FIG. 7 is a structural diagram of another apparatus for determining a hot page in a database according to an embodiment of the present invention.

FIG. 7 is a structural diagram of another apparatus for determining a hot page in a database according to an embodiment of the present invention. In a case of a clustered database system, the apparatus includes database servers 71 and a storage array or storage server 72.

The database servers 71 are configured to configure a counter for each of N pages in the database in a case in which the database is accessed, where each counter is used to count a quantity of times of concurrent access to a page corresponding to the counter, initial values of the counters are equal, the concurrent access means that at least one read command or write command accessing the page needs to wait for accessing the page, the N pages are all pages in the database or N pages in the database, and N is a positive integer. Specifically, the database servers 71 include n servers, which are a server 1, a server 2, . . . , a server n, where n is a natural number that is greater than or equal to 2. Communication is performed between the n servers by using a private network. The n servers communicate with each other by using the private network to coordinate an order of accessing pages in the database. All control files, online logs, and data files are stored on a shared device of the storage array or storage server 72, and can be read and written simultaneously by all nodes in the cluster.

The database servers 71 are further configured to calculate, according to a quantity of times of concurrent access to the $K^{th}$ page and an access time parameter, frequency of concurrent access to the $K^{th}$ page, where K is a positive integer that is less than or equal to N.

The database servers 71 are further configured to determine, in a case in which the frequency of concurrent access to the $K^{th}$ page is greater than or equal to a preset first threshold, that the $K^{th}$ page is a hot page.

The storage array or storage server 72 is configured to store the database. The storage array or storage server 72 includes n storage devices, which are specifically a storage device 1, a storage device 2, . . . , a storage device n, where n is a natural number that is greater than or equal to 2.

The database servers 71 communicate with the storage array or storage server 72 by using a storage area network 73.

Optionally, in an aspect of being further configured to calculate, according to a quantity of times of concurrent access to the $K^{th}$ page and an access time parameter, frequency of concurrent access to the $K^{th}$ page, the database servers 71 are specifically configured to: in a case in which the $K^{th}$ page is concurrently accessed, add 1 to the $K^{th}$ counter corresponding to the $K^{th}$ page, and use a time point at which the $K^{th}$ page is concurrently accessed for the first time as a start counting time point, where K is a positive integer that is greater than or equal to 1 but less than or equal to N. In a case in which the $K^{th}$ page is concurrently accessed for the $M^{th}$ time, use a time point at which the $K^{th}$ page is concurrently accessed for the $M^{th}$ time as an end counting time point, where M is a positive integer. The frequency of concurrent access to the $K^{th}$ page is calculated according to the start counting time point and end counting time point of the $K^{th}$ page and M.

Optionally, in an aspect of being further configured to calculate, according to a quantity of times of concurrent access to the $K^{th}$ page and an access time parameter, frequency of concurrent access to the $K^{th}$ page, the database servers 71 are specifically configured to: periodically count, according to a preset counting period T0, a value increment of a counter corresponding to the $K^{th}$ page, where the T0 may be specifically set according to an actual scenario, or a historical record, or a current requirement; and calculate, according to the T0 and the value increment of the counter corresponding to the $K^{th}$ page, the frequency of concurrent access to the $K^{th}$ page.

Optionally, in an aspect of being further configured to calculate, according to a quantity of times of concurrent access to the $K^{th}$ page and an access time parameter, frequency of concurrent access to the $K^{th}$ page, the database servers 71 are specifically configured to: periodically subtract, according to a preset counting period T0, J from a counter corresponding to the $K^{th}$ page, where J is a positive integer, and J is less than the quantity of times of concurrent access to the $K^{th}$ page; periodically count, according to the period T0, a value obtained after J is subtracted from the counter corresponding to the $K^{th}$ page; and use the value obtained after J is subtracted from the counter corresponding to the $K^{th}$ page, as the frequency of concurrent access to the $K^{th}$ page.

Figure 8:
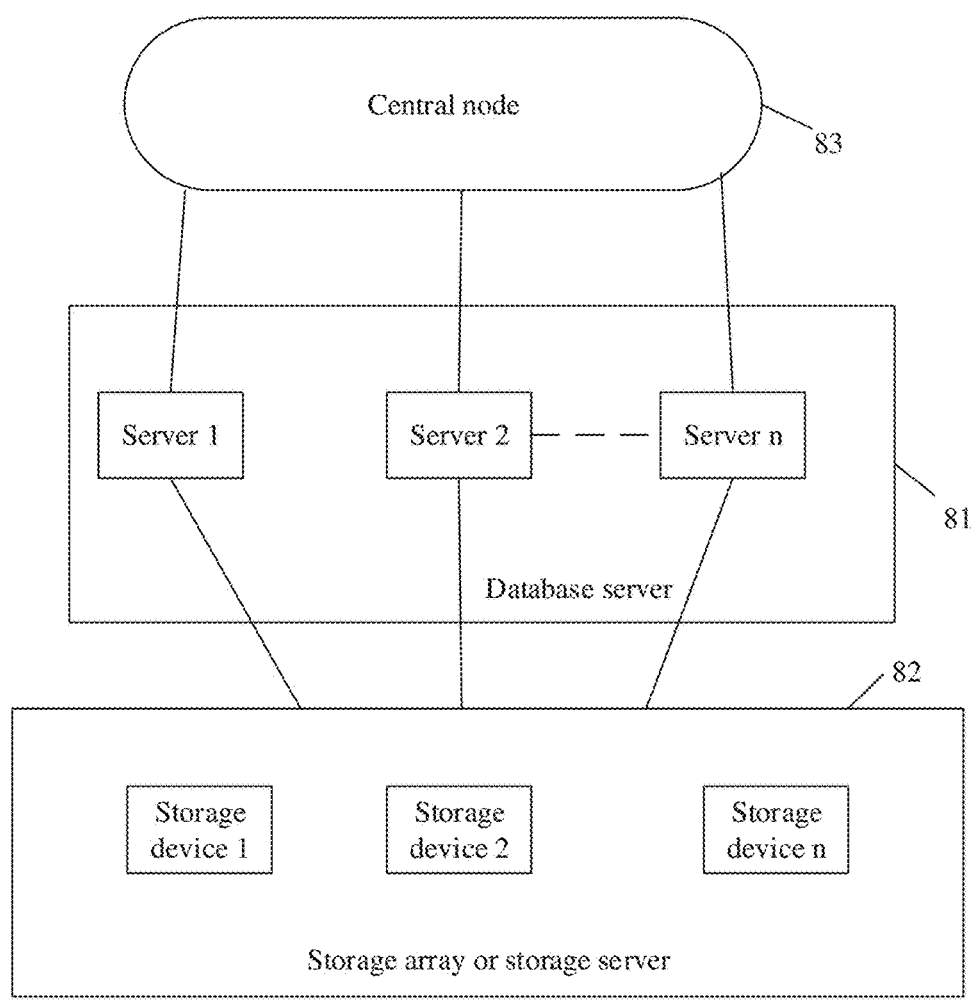
FIG. 8 is a structural diagram of another apparatus for determining a hot page in a database according to an embodiment of the present invention.

Optionally, FIG. 8 shows a structural diagram of another apparatus for determining a hot page in a database according to an embodiment of the present invention. In a case of a clustered database system, a system architecture in FIG. 7 in which the database servers 71 communicate with the storage array or storage server 72 by using the storage area network 73 is replaced with the following architecture: Each database server in database servers 81 in the embodiment corresponding to FIG. 8 has a full-function database engine, and completes a data processing task; and a central node 83 mainly includes a global buffer and a global lock manager, configured to coordinate work of all the database servers 81 to ensure database consistency of all the database servers 81. Same data may be read and written simultaneously in a database replica on each database server in the database servers 81.

The present invention may be implemented in a plurality of implementation manners. The embodiments of the present invention may be executed by a specific software or hardware component. Persons skilled in the art consider that different software or hardware combinations may also be applied to implement the embodiments of the present invention, and that specific operations executed by hardware may also be implemented by software.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for determining a hot page in a database, the method comprising:
    initializing, by a processor of a database system comprising the database, a plurality of counters comprising a counter for each of N pages in the database, wherein for a $K^{th}$ counter of the plurality of counters, the $K^{th}$ counter is used to count a quantity of times of concurrent access to a $K^{th}$ page corresponding to the $K^{th}$ counter,
    concurrent access comprises at least one read command waiting to access the $K^{th}$ page or at least one write command waiting to access the $K^{th}$ page,
    initial values of each counter of the plurality of counters are equal, and
    N is a positive integer;
    calculating, by the processor and according to the quantity of times of concurrent access to the $K^{th}$ page and an access time parameter, frequency of concurrent access to the $K^{th}$ page, wherein K is a positive integer that is less than or equal to N; and
    in response to the frequency of concurrent access to the $K^{th}$ page being greater than or equal to a preset threshold, determining, by the processor, that the $K^{th}$ page is a hot page.

2. The method according to claim 1, wherein the calculating comprises:
    in response to the $K^{th}$ page being concurrently accessed, adding 1 to the $K^{th}$ counter corresponding to the $K^{th}$ page, and using a first time point at which the $K^{th}$ page is concurrently accessed for the first time as a start counting time point;
    in response to the $K^{th}$ page being concurrently accessed for an $M^{th}$ time, using a second time point at which the $K^{th}$ page is concurrently accessed for the Mth time as an end counting time point, wherein M is a positive integer; and
    calculating, according to the start counting time point and the end counting time point of the $K^{th}$ page and M, the frequency of concurrent access to the $K^{th}$ page.

3. The method according to claim 1, wherein the calculating comprises:
    periodically counting, according to a preset counting period T0, a value increment of the $K^{th}$ counter corresponding to the $K^{th}$ page; and
    calculating, according to the preset counting period T0 and the value increment of the $K^{th}$ counter corresponding to the $K^{th}$ page, the frequency of concurrent access to the $K^{th}$ page.

4. The method according to claim 1, wherein the calculating comprises:
    periodically subtracting, according to a preset counting period T0, J from the $K^{th}$ counter corresponding to the $K^{th}$ page, wherein J is a positive integer, and J is less than the quantity of times of concurrent access to the $K^{th}$ page;
    periodically counting, according to the preset counting period T0, a value obtained after J is subtracted from the $K^{th}$ counter corresponding to the $K^{th}$ page; and
    wherein the obtained value is the frequency of concurrent access to the $K^{th}$ page.

5. An apparatus for determining a hot page in a database, the apparatus comprising:
    a processor;
    a memory storing a program to be executed in the processor and the database, the program comprising instructions to
        initialize a plurality of counters comprising a counter for each of N pages in the database, wherein for a $K^{th}$ counter of the plurality of counters, the $K^{th}$ counter is used to count a quantity of times of concurrent access to a $K^{th}$ page corresponding to the $K^{th}$ counter,
        concurrent access comprises at least one read command waiting to access the $K^{th}$ page or at least one write command waiting to access the $K^{th}$ page, initial values of the counter for each of N pages are equal, and N is a positive integer;

calculate, according to the quantity of times of concurrent access to the $K^{th}$ page and an access time parameter, frequency of concurrent access to the $K^{th}$ page, wherein K is a positive integer that is less than or equal to N; and determine, in response to the frequency of concurrent access to the $K^{th}$ page being greater than or equal to a preset threshold, that the $K^{th}$ page is a hot page.

6. The apparatus according to claim 5, wherein the program comprises further instructions for in response to the $K^{th}$ page being concurrently accessed, add 1 to the $K^{th}$ counter corresponding to the $K^{th}$ page, and use a first time point at which the $K^{th}$ page is concurrently accessed for the first time as a start counting time point;

in response to the $K^{th}$ page being concurrently accessed for an $M^{th}$ time, use a second time point at which the $K^{th}$ page is concurrently accessed for the $M^{th}$ time as an end counting time point, wherein M is a positive integer; and calculate, according to the start counting time point and end counting time point of the $K^{th}$ page and M, the frequency of concurrent access to the $K^{th}$ page.

7. The apparatus according to claim 5, wherein the program comprises further instructions for periodically count, according to a preset counting period T0, a value increment of the $K^{th}$ counter corresponding to the $K^{th}$ page; and calculate, according to the preset counting period T0 and the value increment of the $K^{th}$ counter corresponding to the $K^{th}$ page, the frequency of concurrent access to the $K^{th}$ page.

8. The apparatus according to claim 5, wherein the program comprises further instructions for periodically subtract, according to a preset counting period T0, J from the $K^{th}$ counter corresponding to the $K^{th}$ page, wherein J is a positive integer;

periodically count, according to the preset counting period T0, a value obtained after J is subtracted from the $K^{th}$ counter corresponding to the $K^{th}$ page; and wherein the obtained value is the frequency of concurrent access to the $K^{th}$ page.

9. The method of claim 1, wherein the preset threshold is an absolute value that is preset according to a preset requirement.

10. The method of claim 1, wherein the preset threshold is a preset relative value that is expressed as a percentage.

11. The method of claim 1, further comprising:

splitting, by the processor, content of the $K^{th}$ page into a plurality of pages in response to determining that the $K^{th}$ page is the hot page.

12. The method of claim 1, wherein the database comprises a database server, and wherein concurrent access further comprises accesses to the database server.

13. The apparatus of claim 5, wherein the preset threshold is an absolute value that is preset according to a preset requirement.

14. The apparatus of claim 5, wherein the preset threshold is a preset relative value that is expressed as a percentage.

15. The apparatus of claim 5, wherein the program further comprises instructions to:

split content of the $K^{th}$ page into a plurality of pages in response to determining that the $K^{th}$ page is the hot page.

16. The apparatus of claim 5, wherein the database comprises a database server, and wherein concurrent access further comprises accesses to the database server.

17. A method of improving performance of a database, the method comprising:

initializing, by a processor of a database system comprising the database, N counters used to count concurrent accesses to database pages in the database system, wherein N is a positive integer equal to a total quantity of pages in the database system, the N counters comprise a $K^{th}$ counter used to count a quantity of concurrent accesses to a $K^{th}$ page of the database system, and concurrent accesses comprise at least one read command waiting to access the $K^{th}$ page or at least one write command waiting to access the $K^{th}$ page;

calculating, by the processor and according to the $K^{th}$ counter and an access time parameter, frequency of concurrent accesses to the $K^{th}$ page; and splitting, by the processor, content of the $K^{th}$ page into a plurality of pages in response to the frequency of concurrent accesses to the $K^{th}$ page being greater than or equal to a preset threshold.

18. The method according to claim 17, wherein calculating the frequency of concurrent accesses comprises:

periodically subtracting a positive integer J from the $K^{th}$ counter corresponding to the $K^{th}$ page according to a preset counting period $T_o$ to obtain an intermediate value; and periodically counting the intermediate value according to the preset counting period $T_o$, to obtain the frequency of concurrent accesses to the $K^{th}$ page.

19. The method of claim 17, wherein the preset threshold is an absolute value that is preset according to a preset requirement.

20. The method of claim 17, wherein the preset threshold is a preset relative value that is expressed as a percentage.

* * * * *